US009912776B2

(12) United States Patent
Wood et al.

(10) Patent No.: US 9,912,776 B2
(45) Date of Patent: Mar. 6, 2018

(54) EXPLICIT CONTENT DELETION COMMANDS IN A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 14/957,492

(22) Filed: Dec. 2, 2015

(65) Prior Publication Data

US 2017/0163760 A1  Jun. 8, 2017

(51) Int. Cl.
*G06F 15/167* (2006.01)
*H04L 29/08* (2006.01)
*H04L 12/743* (2013.01)

(52) U.S. Cl.
CPC ...... *H04L 67/2852* (2013.01); *H04L 45/7453* (2013.01); *H04L 45/7457* (2013.01); *H04L 67/2842* (2013.01); *H04L 67/327* (2013.01)

(58) Field of Classification Search
CPC ............. H04L 45/7453; H04L 45/7457; H04L 67/327; H04L 67/2842
See application file for complete search history.

(56) References Cited

U.S. PATENT DOCUMENTS

| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |

(Continued)

FOREIGN PATENT DOCUMENTS

| CN | 103873371 | 6/2014 |
| DE | 1720277 A1 | 6/1967 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Padma Mundur

(57) ABSTRACT

One embodiment provides a system that deletes cached content. During operation, the system generates, by a content producing device, a content object packet that includes a name for the content object and a deletion identifier that is used to verify a subsequent deletion command. The system receives a notification message that includes a routable prefix for a router and indicates that the router has cached the content object packet. The system stores in a data structure a mapping between the routable prefix, the name, and a previously generated deletion token which is used as a pre-image of the deletion identifier. In response to determining a condition to delete the cached content object packet, the system transmits a deletion command based on the routable prefix, wherein the deletion command includes the deletion token and the name for the cached copy of the content object packet to be deleted.

14 Claims, 10 Drawing Sheets

(56) References Cited

U.S. PATENT DOCUMENTS

| | | |
|---|---|---|
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |

(56) References Cited

U.S. PATENT DOCUMENTS

| | | |
|---|---|---|
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0050491 A1* | 3/2007 | Kataoka ............ H04L 67/2814 709/223 |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |

(56) References Cited

U.S. PATENT DOCUMENTS

| | | |
|---|---|---|
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |

(56) References Cited

U.S. PATENT DOCUMENTS

| | | |
|---|---|---|
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1* | 8/2013 | Xie .................. H04L 67/327 709/213 |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0258490 A1* | 9/2014 | Kim .................. H04L 67/327 709/223 |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0120924 A1* | 4/2015 | Scott .................. H04L 69/22 709/225 |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |

(56) References Cited

FOREIGN PATENT DOCUMENTS

| | | |
|---|---|---|
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2015084327 | 6/2015 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

"PBC Library-Pairing-Based Cryptography-About," http://crypto.stanford.edu/pbc. downloaded Apr. 27, 2015.

C. Gentry and A. Silverberg. Hierarchical ID-Based Cryptography. Advances in Cryptology—ASIACRYPT 2002. Springer Berlin Heidelberg (2002).

Boneh et al., "Collusion Resistant Broadcast Encryption With Short Ciphertexts and Private Keys", 2005.

D. Boneh and M. Franklin. Identity-Based Encryption from the Weil Pairing. Advances in Cryptology—CRYPTO 2001, vol. 2139, Springer Berlin Heidelberg (2001).

Ateniese et al., "Improved Proxy Re-Encryption Schemes with Applications to Secure Distributed Storage", 2006.

Xiong et al., "CloudSeal: End-to-End Content Protection in Cloud-based Storage and Delivery Services", 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digit.

J. Shao and Z. Cao. CCA-Secure Proxy Re-Encryption without Pairings. Public Key Cryptography. Springer Lecture Notes in Computer Sciencevol. 5443 (2009).

Gopal et al. "Integrating content-based Mechanisms with hierarchical File systems", Feb. 1999, University of Arizona, 15 pages.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/www.adobe.com/content/dam/Adobe/en/devnet/rtmp/ pdf/rtmp specification 1.0.pdf.

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Kamara and K. Lauter. Cryptographic Cloud Storage. Financial Cryptography and Data Security. Springer Berlin Heidelberg (2010).

Sandvine, Global Internet Phenomena Report—Spring 2012. Located online at http://www.sandvine.com/downloads/ documents/Phenomenal H 2012/Sandvine Global Internet Phenomena Report 1H 2012.pdf.

The Despotify Project (2012). Available online at http://despotify.sourceforge.net/.

V. K. Adhikari, S. Jain, Y. Chen, and Z.-L. Zhang. Vivisecting Youtube:An Active Measurement Study. In INFOCOM12 Mini-conference (2012).

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network &oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

B. Ahlgren et al., 'A Survey of Information-centric Networking' IEEE Commun. Magazine, Jul. 2012, pp. 26-36.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

(56) References Cited

OTHER PUBLICATIONS

Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim Hj Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.

(56) References Cited

OTHER PUBLICATIONS

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI. 1993.

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014}: 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network and Computer Applications 35 (2012) 221-229.

D. Trossen and G. Parisis, "Designing and realizing and information-centric Internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

(56) References Cited

OTHER PUBLICATIONS

Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.
Extended European Search Report in corresponding European Application No. 16199629.3, dated Apr. 5, 2017, 9 pages.

* cited by examiner

EXPLICIT CONTENT DELETION COMMANDS IN A CONTENT CENTRIC NETWORK

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814"); and U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. Pat. No. 8,204,060, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009 (hereinafter "U.S. Pat. No. 8,204,060"); and U.S. Pat. No. 8,386,622, entitled "METHOD AND APPARATUS FOR FACILITATING COMMUNICATION IN A CONTENT CENTRIC NETWORK," by inventor Van L. Jacobson, filed 11 Dec. 2008 (hereinafter "U.S. Pat. No. 8,386,622");

the disclosures of which are herein incorporated by reference in their entirety.

BACKGROUND

Field

This disclosure is generally related to distribution of digital content. More specifically, this disclosure is related to a system for explicitly deleting content which is cached at intermediate routers in a CCN.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients and consumers, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. As an interest is routed through the network from a consumer to a producer, each intermediate CCN router adds an entry in its pending interest table (PIT) corresponding to the interest and forwards the interest to the next CCN router. When a matching content object is generated by and sent from the producer back to the consumer, the content object follows the reverse path of the interest. Each intermediate CCN router can cache a copy of the content object, which allows the router to fulfill a subsequent interest for the content from its cache.

The lifetime for content cached in a router may depend upon the amount of space present in the cache, the cache eviction policy of the router, and the timeout specified by the producer. For example, under a router's eviction policy, a router may evict or remove content from its cache if there is insufficient space for new content, or if the content has surpassed its lifetime, such as a producer-specified timeout. However, the current CCN protocol does not provide for explicit deletion commands, e.g., a request to explicitly evict content from the cache.

SUMMARY

One embodiment provides a system that allows explicit content deletion commands in a centralized manner. During operation, the system generates, by a content producing device, a content object packet that includes a name for the content object and a deletion identifier that is used to verify a subsequent deletion command from the content producing device, wherein the name is a hierarchically structured variable length identifier that includes contiguous name components ordered from a most general level to a most specific level. The system receives a notification message that includes a routable prefix for a router and indicates that the router has cached a copy of the content object packet. The system stores in a data structure a mapping between the routable prefix, the name, and a previously generated deletion token which is used as a pre-image of the deletion identifier. In response to determining a condition to delete the cached copy of the content object packet at the router, the system transmits a deletion command based on the routable prefix, wherein the deletion command includes the deletion token and the name for the cached copy of the content object packet to be deleted.

In some embodiments, the system generates the deletion token such that the deletion identifier is the result of a hash function performed on the deletion token.

In some embodiments, the deletion command is transmitted to the router and causes the router, in response to determining that a hash of the deletion token matches the deletion identifier, to: delete the cached copy; and transmit an acknowledgment of the deletion command to the content producing device.

In some embodiments, the deletion identifier is used by the router to verify the deletion command.

In some embodiments, the system receives an acknowledgment of the deletion command from the router.

In some embodiments, the system identifies in the data structure a plurality of routable prefixes which correspond to a plurality of routers, wherein the routable prefixes are associated with the name and the deletion token. The system transmits the deletion command to the plurality of routers based on the respective routable prefixes, which causes each of the plurality of routers, in response to determining that a hash of the deletion token matches the deletion identifier, to: delete the cached copy; and transmit an acknowledgment of the deletion command to the content producing device.

In some embodiments, the system receives an acknowledgment of the deletion command from each of the plurality of routers.

In some embodiments, the notification message is a first interest packet that does not leave a state in a pending interest table of a receiving entity, and wherein the deletion command is a second interest packet that is a request for a responsive content object packet corresponding to an acknowledgment.

Another embodiment provides a system that allows explicit content deletion commands in a distributed manner. During operation, the system generates, by a content producing device, a content object packet that includes a name for the content object and a deletion identifier that is used to verify a subsequent deletion command from the content producing device, wherein the name is a hierarchically structured variable length identifier that includes contiguous name components ordered from a most general level to a most specific level. The system receives a notification message that includes routing information for a service node which processes deletion commands, wherein the message indicates that the service node is cataloging routers which have cached a copy of the content object packet. The system stores in a first data structure a mapping between the routing information, the name, and a previously generated deletion token which is used as a pre-image of the deletion identifier. In response to determining a condition to delete the cached copy of the content object packet at a router, the system transmits a deletion command based on the routing information, wherein the deletion command includes the deletion token and the name for the cached copy of the content object packet to be deleted.

In a variation on this embodiment, the system generates the deletion token such that the deletion identifier is the result of a hash function performed on the deletion token.

In a further variation, the system receives, by the service node, a notification message that includes a routable prefix for the router and indicates that the router has cached a copy of the content object packet. The service node stores in a second data structure a mapping between the routable prefix, the name, and the deletion identifier.

In a further variation, the deletion command is transmitted to the service node and causes the service node, in response to determining that a hash of the deletion token matches the deletion identifier, to transmit the deletion command to the router.

In a further variation, the deletion command causes the router, in response to determining that a hash of the deletion token matches the deletion identifier, to: delete the cached copy; and transmit an acknowledgment of the deletion command to the service node.

In a further variation, the service node receives an acknowledgment of the deletion command from the router.

In a further variation, the deletion command is transmitted to the service node and causes the service node, in response to determining that a hash of the deletion token matches the deletion identifier, to: identify in the second local data structure a plurality of routable prefixes which correspond to a plurality of routers, wherein the routable prefixes are associated with the name and the deletion token; and transmit the deletion command to the plurality of routers based on the respective routable prefixes. Transmitting the deletion command to the plurality of routers causes each of the plurality of routers, in response to determining that a hash of the deletion token matches the deletion identifier, to: delete the cached copy; and transmit an acknowledgment of the deletion command to the service node.

In a further variation, the system receives, by the content producing device, an acknowledgment of the deletion command from the service node.

In a further variation, a notification message received by the service node is a first interest packet that does not leave a state in a pending interest table of a receiving entity, and wherein the deletion command is a second interest packet that is a request for a responsive content object packet corresponding to an acknowledgment.

Another embodiment provides a system that allows explicit content deletion commands in a centralized or distributed manner. During operation, the system receives, by a router, a content object packet that includes a name for the content object and a deletion identifier that is used to verify a subsequent deletion command, wherein the name is a hierarchically structured variable length identifier that includes contiguous name components ordered from a most general level to a most specific level. The router stores in a cache a copy of the content object packet. The router generates a notification message that includes a routable prefix for the router and indicates that the router has cached the copy of the content object packet. In response to receiving a deletion command based on the routable prefix, wherein the deletion command includes the deletion token and the name for the cached copy of the content object packet to be deleted, and in response to determining that a hash of the deletion token matches the deletion identifier: the router deletes the copy of the content object from the cache; and transmits an acknowledgment of the deletion command.

In a variation on this embodiment, the notification message is transmitted to a content producing device or a service node which processes deletion commands. Responsive to deleting the copy of the content object from the cache, the router also does the following: responsive to the deletion command being received from the content producing device, the router transmits the acknowledgment to the content producing device; and responsive to the deletion command being received from the service node, the router transmits the acknowledgment to the service node.

In a further variation, the routable prefix is included in the notification message by appending the routable prefix to the name for the notification message, wherein the notification message is an interest packet.

BRIEF DESCRIPTION OF THE FIGURES

In the figures, like reference numerals refer to the same figure elements.

DETAILED DESCRIPTION

Figure 1:
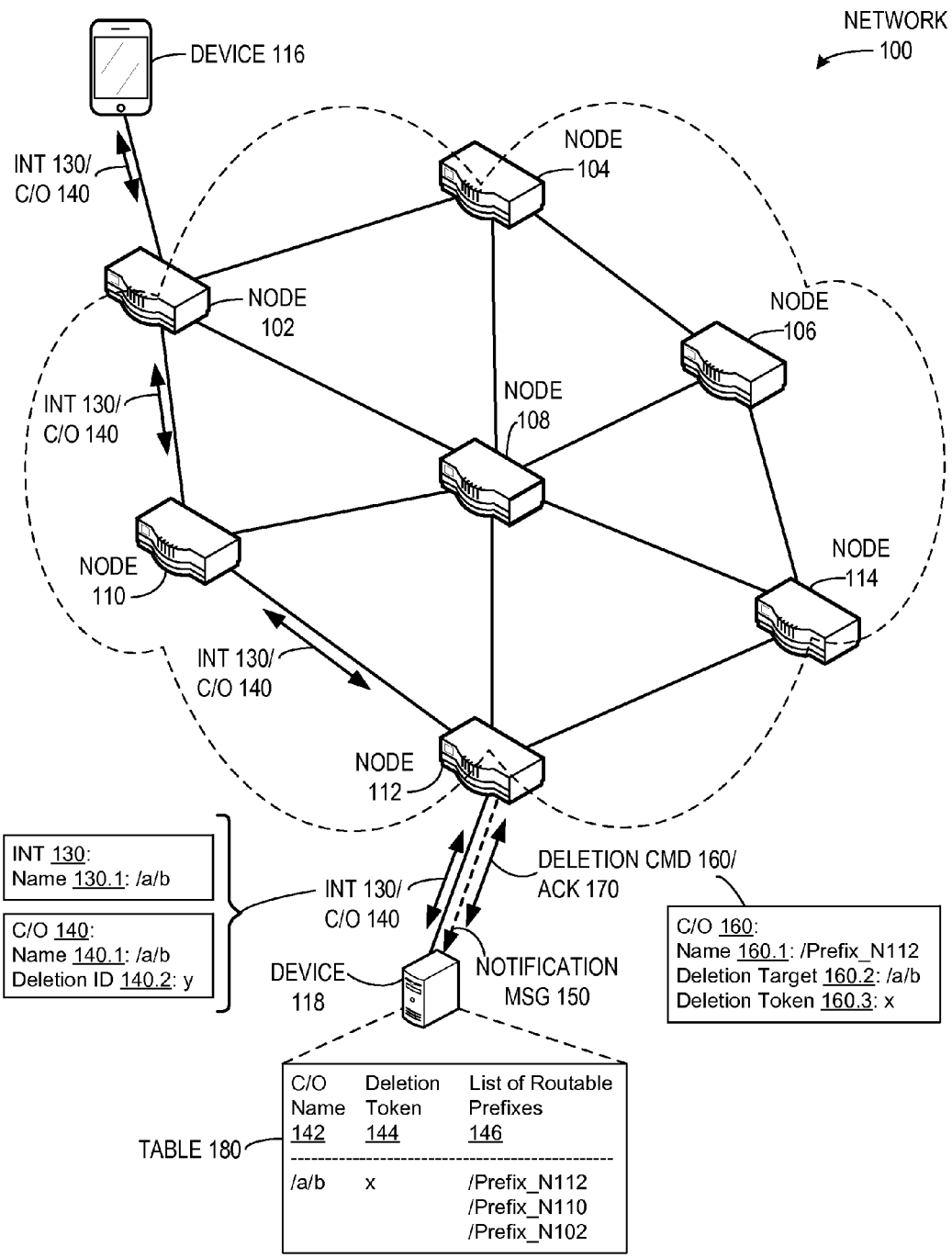
FIG. 1 illustrates an exemplary network that facilitates explicit content deletion commands, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of explicit content revocation in a CCN by providing a system that allows a content producer to transmit deletion commands to all routers that have a cached copy of specific content. A router is an intermediate node in a CCN and can be a forwarder that maintains a cache. The router can store received content in its cache for a period of time determined by its cache eviction policy, which may depend upon available cache space or a producer-specified lifetime for the content. The current CCN protocol does not support explicit content deletion commands from the producer. Embodiments of the present invention provide a system that allows a producer to determine a need to delete specific content cached in a CCN, and to issue a corresponding deletion command to the network, e.g., to all routers that possess a cached copy of the content. The system allows the routers to notify the producer of initially caching the content object, and to verify a subsequently received deletion command. A router has a well-defined and routable name prefix, and the system supports stateless interests or push messages which have routable names and carry payloads, e.g., CCN messages that do not leave any state in a pending interest table and thus do not aggregate.

During operation, the producer can publish a content object that has a name and can include a deletion identifier "y" such that y is equal to "H(x)," where "x" is a deletion token that is a random string generated by the producer, and "H(·)" is a cryptographic, collision-resistant hash function. A router can receive and cache the content object along with the corresponding deletion identifier. When the producer subsequently determines to delete the content object from the router's cache, the producer can generate and send an interest (or push message) which is a deletion command and includes the deletion token x. The router can receive the push message, determine a cache hit, and identify the previously stored deletion identifier y. The router can verify the producer by performing a hash operation on the deletion token x to determine whether the result of H(x) is equal to the deletion identifier y. If the result matches, the router successfully verifies that the deletion command issued from the original producer, as only the producer can possess the deletion token x, which is the pre-image of the deletion identifier y (e.g., the producer generates x and subsequently uses x as the input to the hash function, such that y is equal to H(x)). The router can then delete the content object from its cache.

The system can identify which routers have cached the content object (and correspondingly, the routers to which the producer subsequently issues the deletion command) by a centralized or a distributed mechanism. In the centralized mechanism, the producer maintains knowledge of all routers that cache the content object. During operation, a router R can receive and cache a content object O with a name N and the deletion identifier y. The router can create a push message with a name N, append the router's routable prefix name N(R) to the push message, and forward the push message upstream to the producer. The producer can store a list of the routable prefixes associated with the specific content object name N.

When the producer wishes to delete content object O from the network, the producer can create a deletion command (or push message) for each of the routable prefixes (e.g., N(R)) associated with the content object name N, and insert the deletion token x in the deletion command. The producer can also identify the deletion target by including the name N for content object O, and subsequently issue the deletion commands to the network. Router R can receive and process the deletion command as described above (e.g., check that a hash of the deletion token is equal to the deletion identifier, and delete the content object O with name N from its cache). Furthermore, in response to the deletion command, router R can reply to the producer with an acknowledgment ("ACK") message in a content object. Because each ACK is a content object that is signed by the router, the producer can verify the authenticity of the ACK for correctness.

In the distributed mechanism, the system uses a service for cataloging and broadcasting all deletion commands. For example, the service can be a based on a Distributed Hash Table ("DHT") that maps content object names to corresponding routers. A root node in the DHT may be responsible for storing this mapping. One way to identify a root node is to compute the hash of the content object name, i.e., H(N(O)). During operation, the router R can send the push message (or notification message) to the root node, instead of to the producer, and include the router's routable prefix N(R) in the push message. As discussed above, the root node is responsible for storing a list of the routable prefixes associated with the specific content object name N.

Subsequently, the producer can send the deletion command for content object name N to the root node, instead of to each router. The root node can then send the deletion command to each of the routers associated with N, e.g., based on the previously stored mapping of routable prefixes to N. Each router can receive and process the deletion command, and send a responsive ACK to the root node. Upon receiving an ACK from all of the routers, the root node can issue an ACK to the producer to indicate that the request has been fulfilled.

In the distributed system, the burden of recording target routers and transmitting deletion commands shifts from the producer to the root node. Because the list of prefixes can correspond to routers that are co-located in a similar geographic network or region, the distributed system may provide a more efficient mechanism than the centralized system for explicit content deletion commands. The transmission of the deletion command may be performed hierarchically, e.g., if the DHT-based service is run by a parent ISP that maintains a network of children ISPs. This may decrease the scope and knowledge of individual routers required by the producer. For example, if a particular DHT service node is responsible for a specific region, a producer can simply issue one request to that service node to delete content from that entire specific region.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "content object"): A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "interest"): A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Exemplary Network and Environment

FIG. 1 illustrates an exemplary network 190 that facilitates explicit content deletion commands, in accordance with an embodiment of the present invention. Network 100 can include a content requesting device 116, a content producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). During operation, client computing device 116 can generate and send an interest 130 with a name 130.1 of "/a/b." Interest 130 can travel through a network (such as a CCN) via nodes or routers 102, 110, and 112, finally reaching content producing device or producer 118. Producer 118 can generate and transmit a responsive content object 140 with a name 140.1 of "/a/b" and a deletion identifier 140.2 of "y." Deletion identifier 140.2 may be the result of a hash function performed on a randomly generated deletion token, and may be subsequently used by a router to verify the producer of content object 140. As content object 140 travels back to device 116, each intermediate router (e.g., 112, 110, and 102) caches content object 140 along with name 140.1 and deletion identifier 140.2. Each intermediate router also sends to producer 118 a notification message that includes the name of the received and cached content object and the routable prefix of the router, which producer 118 stores in a table 180. Table 180 can include a content object name 142, a deletion token 144, and a list of routable prefixes 146 which correspond to the name and token. For example, upon receiving content object 140, router 112 can send to producer 118 a notification message 150 which includes the name "/a/b" for content object 140, and routable prefix "/Prefix_N112" for router 112. Producer 118 can store the prefix in the entry corresponding to the name. Producer 118 may previously store a mapping between the content object name and the deletion token x.

Subsequently, producer 118 may determine a need to delete all cached copies of content object 140 in network 100. Producer 118 can send a deletion command to all routers listed in table 180 based on routable prefixes 146. For example, producer 118 can send a deletion command 160 with a name 160.1 of "/Prefix_N112" to router 112, where deletion command 160 includes a deletion target 160.2 with a value of "/a/b" (which is the name of the content object to be deleted) and a deletion token 160.3 with a value of "x." A receiving router, such as router 112, can receive deletion command 160, perform a hash operation on deletion token x, and, upon successfully verifying that H(x) is equal to the previously stored deletion identifier y for content object 140, delete content object 140 from its cache. Router 112 can then send an acknowledgment 170 back to producer 118.

Figure 2A:
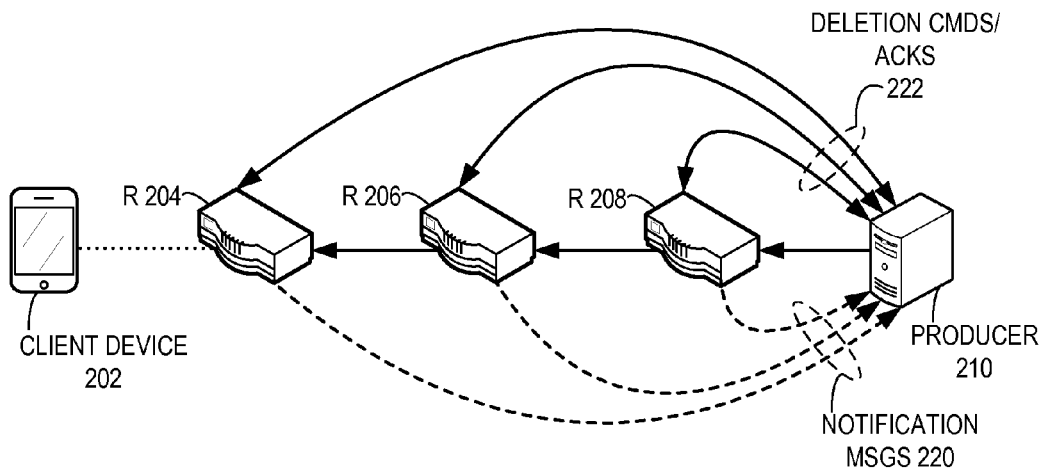
FIG. 2A illustrates an exemplary environment that facilitates explicit content deletion commands in a centralized manner, in accordance with an embodiment of the present invention.

FIG. 2A illustrates an exemplary environment that facilitates explicit content deletion commands in a centralized manner, in accordance with an embodiment of the present invention. In the centralized system, the producer is responsible for cataloging notification messages from and transmitting deletion commands to the appropriate routers. During operation, a client computing device 202 can send an interest for a content object, which can travel through routers 204, 206, and 208, and be fulfilled by a producer 210. Producer 210 can return a responsive content object that includes the deletion identifier. Each intermediate router, e.g., routers 204-208, can cache the content object and return a notification message that includes the router's routable prefix (e.g., notification messages 220). Producer 210 can store a mapping between the content object name, the deletion token (e.g., the pre-image of the deletion identifier), and a list of routable prefixes. Producer 210 can subsequently send deletion commands 222 (which include the deletion token) to the routers based on the routable prefixes in the stored list. Upon verifying the deletion token, routers 204-208 can delete the content object from their respective cache and send acknowledgments 222 back to producer 210. An exemplary communication in a centralized system is described below in relation to FIG. 3A.

Figure 2B:
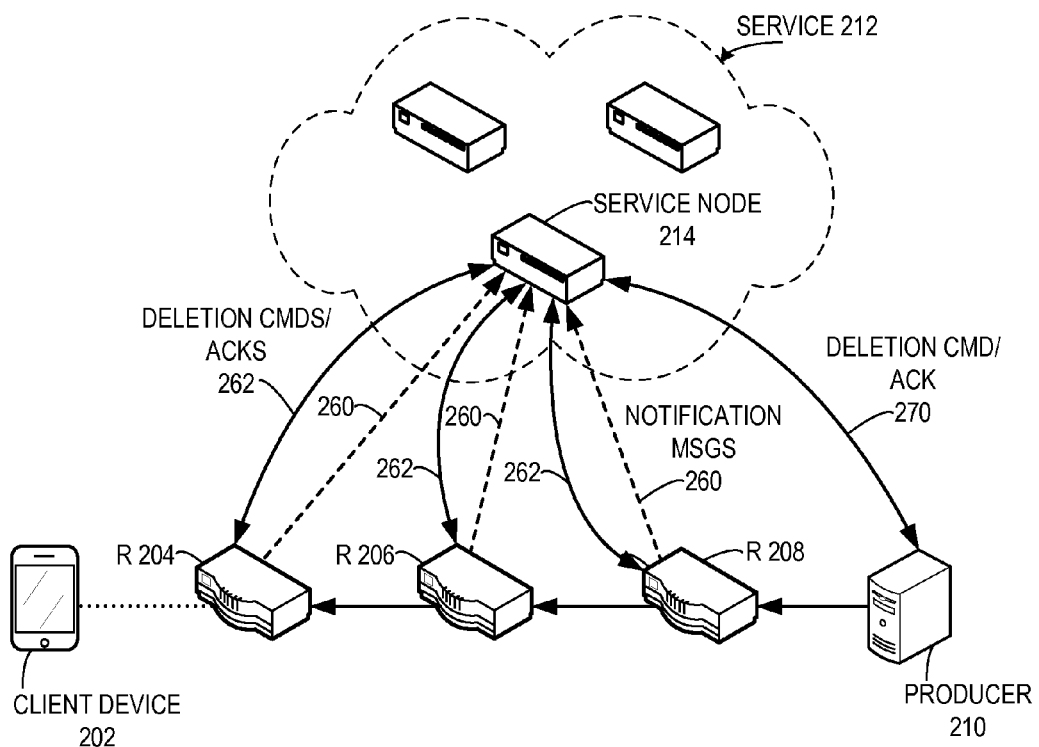
FIG. 2B illustrates an exemplary environment that facilitates explicit content deletion commands in a distributed manner, in accordance with an embodiment of the present invention.

FIG. 2B illustrates an exemplary environment that facilitates explicit content deletion commands in a distributed manner, in accordance with an embodiment of the present invention. In the distributed system, a DHT-based service, rather than the producer, is responsible for communicating with the routers to process the explicit deletion commands. A service 112 may contain a plurality of service nodes, including a service node 114. Node 114 can be a root node in service 112 which is responsible for storing the mapping between a content object name and a specific router. During operation, upon receiving the responsive object from producer 210 that includes the deletion identifier, each intermediate router (e.g., routers 204-208) caches the content object and the deletion identifier, and returns to service node 214 a notification message that includes the router's routable prefix (e.g., notification messages 260). Service node 114 can store a mapping between the content object name, the deletion identifier, and a list of routable prefixes. Producer 210 can subsequently send a deletion command 270 (which includes the deletion token) to service node 214, which can first verify the deletion token and then transmit deletion commands 262 (which also include the deletion token) to the routers based on the routable prefixes in its stored list (e.g., routers 204-208). Upon verifying the deletion token, routers 204-208 can delete the content object from their respective cache and send acknowledgments 262 back to service node 214. Upon receiving an acknowledgment from each of the listed routers (e.g., routers 204-208), service node 214 sends an acknowledgment 270 to producer 210. Thus, in the distributed system, producer 210 does not need knowledge of the individual routers which have cached specific content. Producer 210 need only have knowledge of which services or nodes are acting as service nodes for a particular content object. In some embodiments, upon receiving notification messages 260, service node 214 sends producer 210 a notification message which indicates that service node 214 is acting as a root node for specific content, e.g., by cataloging routers which have cached a copy of a content object and by processing content deletion commands for that content object. An exemplary communication in a distributed system is described below in relation to FIG. 3B.

Exemplary Communication in a Centralized System

Figure 3A:
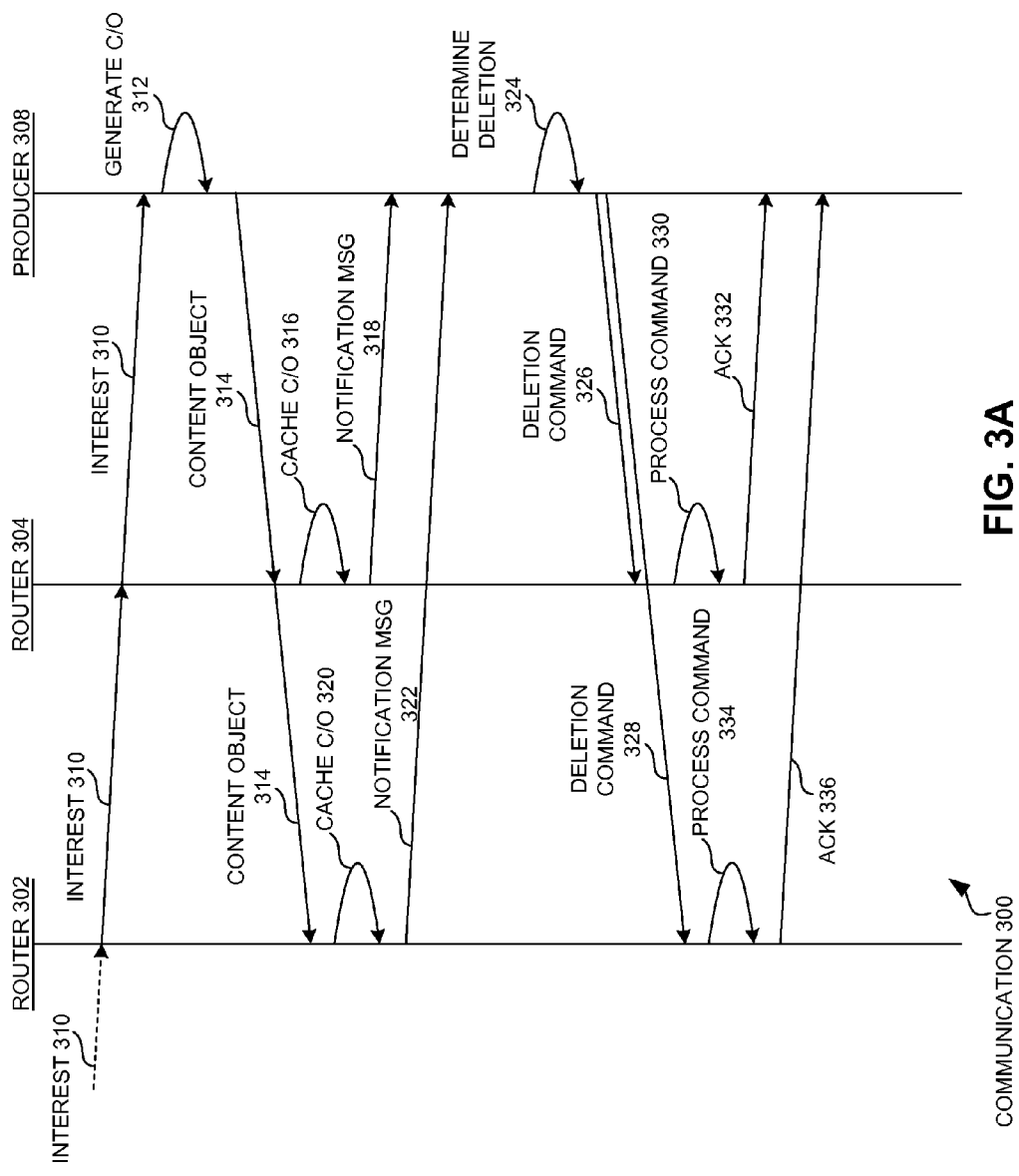
FIG. 3A illustrates an exemplary communication between a producer and multiple routers, which facilitates explicit content deletion commands in a centralized manner, in accordance with an embodiment of the present invention.

FIG. 3A illustrates an exemplary communication 300 between a producer 308 and multiple routers 302 and 304, which facilitates explicit content deletion commands in a centralized manner, in accordance with an embodiment of the present invention. During operation, router 302, router 304, and producer 308 can receive an interest 310. Producer 308 can generate a responsive content object that has a name, and can also generate a deletion token (function 312). Producer 308 can return responsive content object 314, which includes a deletion identifier which is the result of a hash function performed on the deletion token. Producer 308 can also store in a table a mapping between the name and the deletion token. Routers 304 and 302 can receive content object 314, along with the deletion identifier (functions 316 and 320). Routers 304 and 302 can then send notification messages 318 and 322, which include the routable prefix for the respective router. Producer 308 can store a mapping between the name for the content object, the deletion token, and the routable prefixes (as shown in table 180 of FIG. 1).

Producer 308 can subsequently detect a condition or determine a need to delete all cached copies of content object 314 (function 324). Producer 308 can identify from the table routers 304 and 302 as corresponding to the name for the content to be deleted, and issue deletion commands 326 and 328 to, respectively, routers 304 and 302 based on their routable prefixes. Commands 326 and 328 can include the deletion token. Routers 304 and 302 can process deletion commands 326 and 328 by verifying that a hash of the deletion token matches the previously stored deletion identifier, and deleting the cached copy of content object 314 from the respective caches (functions 330 and 334). Routers 304 and 302 can then send acknowledgments 332 and 336, respectively, to producer 308.

Exemplary Communication in a Distributed System

Figure 3B:
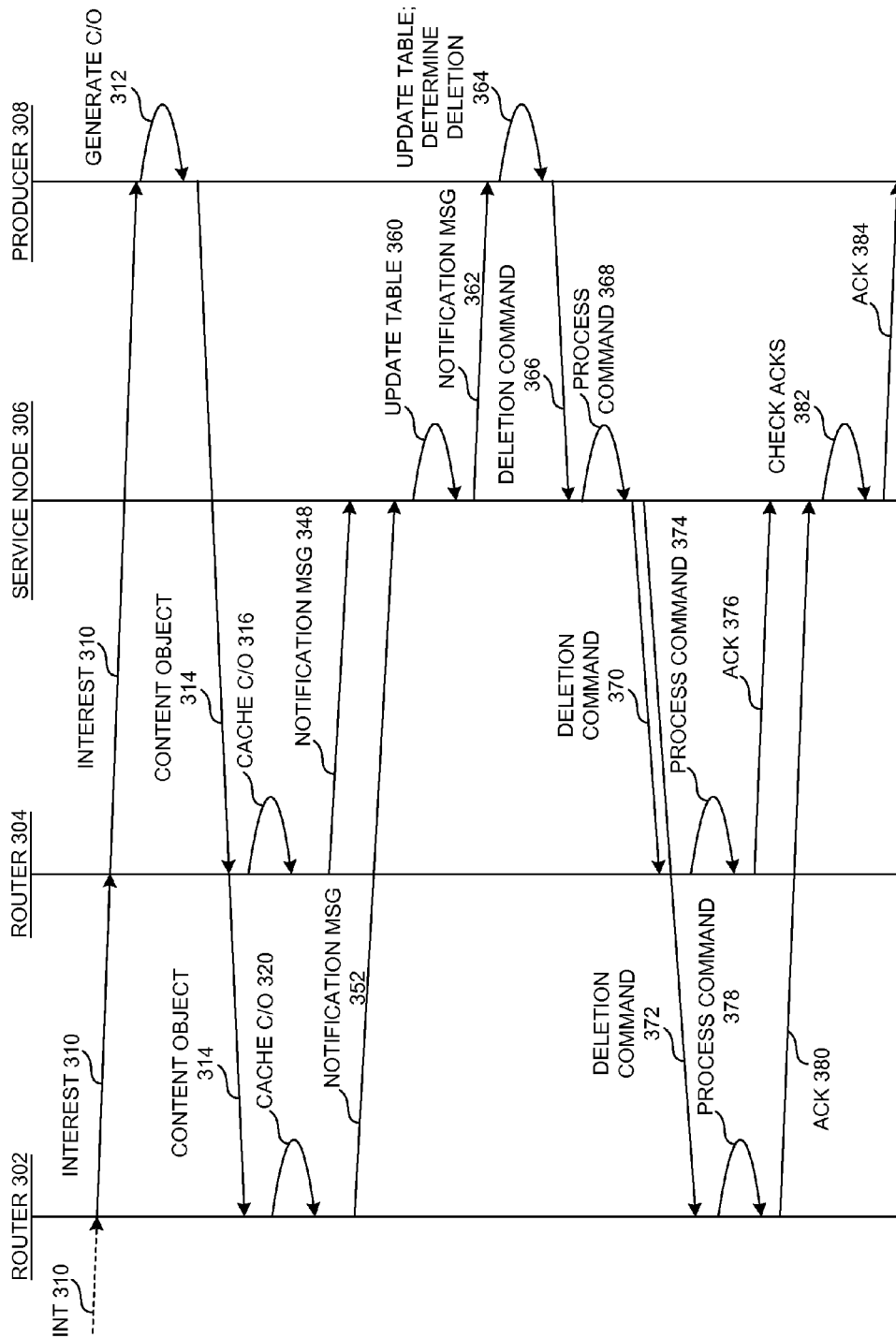
FIG. 3B illustrates an exemplary communication between a producer, a service node, and multiple routers, which facilitates explicit content deletion commands in a distributed manner, in accordance with an embodiment of the present invention.

FIG. 3B illustrates an exemplary communication 350 between a producer 308, a service node 306, and multiple routers 302 and 304, which facilitates explicit content deletion commands in a distributed manner, in accordance with an embodiment of the present invention. During operation, router 302, router 304, and producer 308 can receive an interest 310. Producer 308 can generate a responsive content object that has a name, and can also generate a deletion token (function 312). Producer 308 can return responsive content object 314, which includes a deletion identifier which is the result of a hash function performed on the deletion token. Producer 308 can also store in a first table a mapping between the name and the deletion token. Routers 304 and 302 can receive content object 314, along with the deletion identifier (functions 316 and 320). Routers 304 and 302 can then send to service node 306 (instead of to producer 308) notification messages 348 and 352, which include the routable prefix for the respective router. Service node 306 can store in a second table a mapping between the name for the content object, the deletion identifier, and the routable prefixes (function 360). Service node 306 can send a notification message 362 to producer 308, where the message can include routing or other identifying information for service node 306. Notification message 362 can also indicate that service node 306 is cataloging routers which have cached a copy of content object 314 based on the name for content object 314, and that service node 306 is responsible for processing deletion commands associated with content object 314.

Producer 308 can store in the first table a mapping between the content object name and the routing information for service node 214, and subsequently detect a condition or determine a need to delete all cached copies of content object 314 (function 324). Producer 308 can identify service node 214 as corresponding to the name for the content to be deleted, and issue a deletion command 366 to service node 306. Command 366 can include the deletion token. Service node 306 can process deletion commands 366 by verifying that a hash of the deletion token matches the previously stored deletion identifier (function 368). Upon a successful verification, service node 306 can identify from the second table routers 304 and 302 as corresponding to the name for the content to be deleted, and issue deletion commands 370 and 372 to, respectively, routers 304 and 302 based on their routable prefixes. Commands 370 and 372 can include the deletion token x. Routers 304 and 302 can process deletion commands 370 and 372 by verifying that a hash of the deletion token x matches the previously stored deletion identifier, and by subsequently deleting the cached copy of content object 314 from their respective cache (functions 374 and 378). Routers 304 and 302 can then send acknowledgments 376 and 380, respectively, to service node 306. Service node 306 can determine that an acknowledgment of the deletion command is received from each router that cached a copy of content object 314 (e.g., from routers 304 and 302), which indicates that the routers deleted their cached copy (function 382). Service node 306 can then send an acknowledgment 384 to producer 308.

Role of Content Producing Device in a Centralized System

Figure 4:
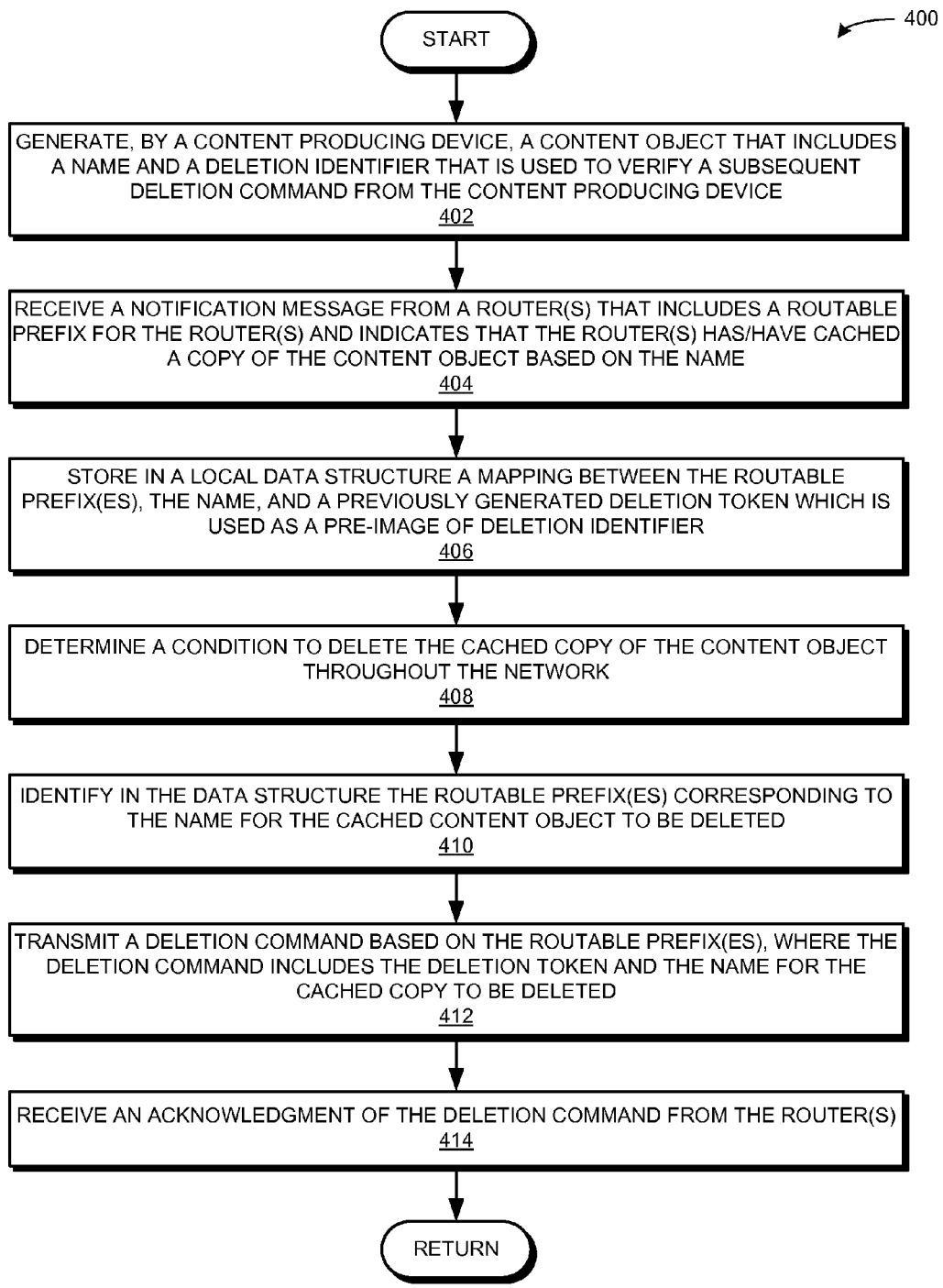
FIG. 4 presents a flow chart illustrating a method by a content producing device for facilitating explicit content deletion commands in a centralized manner, in accordance with an embodiment of the present invention.

FIG. 4 presents a flow chart 400 illustrating a method by a content producing device for facilitating explicit content deletion commands in a centralized manner, in accordance with an embodiment of the present invention. During operation, the system generates, by a content producing device or a producer, a content object that includes a name for the content object and a deletion identifier that is used to verify a subsequent deletion command from the content producing device (operation 402). The producer can generate the deletion identifier by first generating a random bit string ("deletion token") and performing a hash function on the deletion token that results in the deletion identifier. The producer receives a notification message from a router(s) that includes a routable prefix for the router(s) and indicates that the router(s) has/have cached a copy of the content object based on the name (operation 404). The producer stores in a data structure a mapping between the routable prefix(es), the name for the content object, and the previously generated deletion token which is used as a pre-image of the deletion identifier (operation 406). The producer determines a condition to delete the cached copy of content object throughout the network (operation 408). The producer identifies in the data structure the routable prefix(es) corresponding to the name for the cached content object to be deleted (operation 410). The producer transmits a deletion command based on the routable prefix(es), where the deletion command includes the deletion token and the name for the cached copy to be deleted (operation 412). The producer receives an acknowledgment of the deletion command from the router(s) (operation 414). The acknowledgment indicates that the router(s) has/have deleted the copy of the content object from the respective cache.

Role of Content Producing Device and Service Node in a Centralized System

Figure 5A:
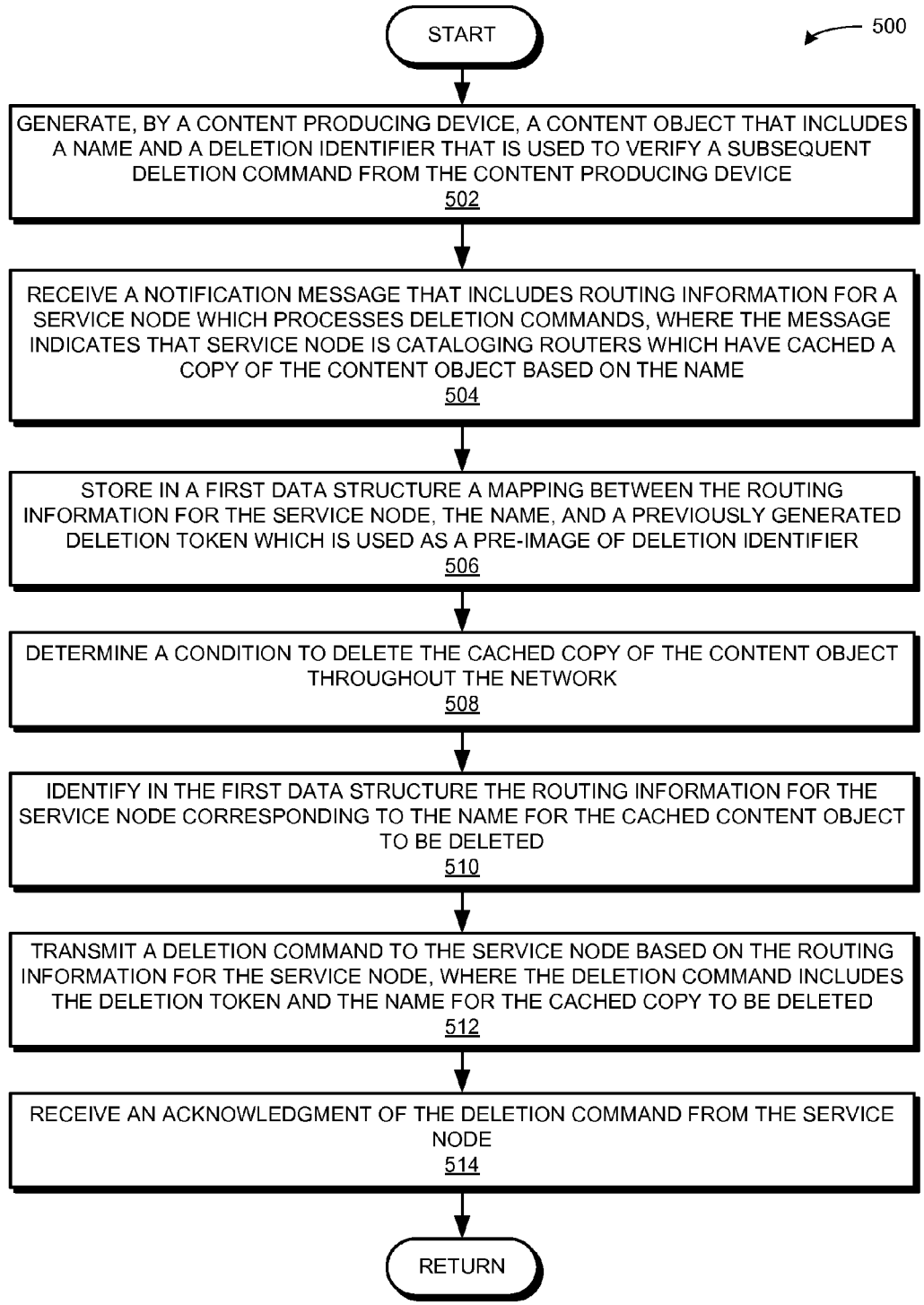
FIG. 5A presents a flow chart illustrating a method by a content producing device for facilitating explicit content deletion commands in a distributed manner, in accordance with an embodiment of the present invention.

FIG. 5A presents a flow chart 500 illustrating a method by a content producing device for facilitating explicit content deletion commands in a distributed manner, in accordance with an embodiment of the present invention. During operation, the system generates, by a content producing device or a producer, a content object that includes a name for the content object and a deletion identifier that is used to verify a subsequent deletion command from the content producing device (operation 502). The producer can generate the deletion identifier by first generating a random bit string ("deletion token") and performing a hash function on the deletion token that results in the deletion identifier. The producer receives a notification message from a service node, which processes deletion commands (operation 504). The message includes routing information for the service node and indicates that the service node is cataloging routers which have cached a copy of the content object based on the name. The producer stores in a first data structure a mapping between the routing information for the service node, the name for the content object, and the previously generated deletion token which is used as a pre-image of the deletion identifier (operation 506). The producer determines a condition to delete the cached copy of content object throughout the network (operation 508). The producer identifies in the first data structure the routing information for the service node corresponding to the name for the cached content object to be deleted (operation 510). The producer transmits a deletion command to the service node based on the routing information, where the deletion command includes the deletion token and the name for the cached copy to be deleted (operation 512). The producer receives an acknowledgment of the deletion command from the service node (operation 514). The acknowledgment indicates that the relevant routers in the network have deleted their copy of the content object from their respective caches.

Figure 5B:
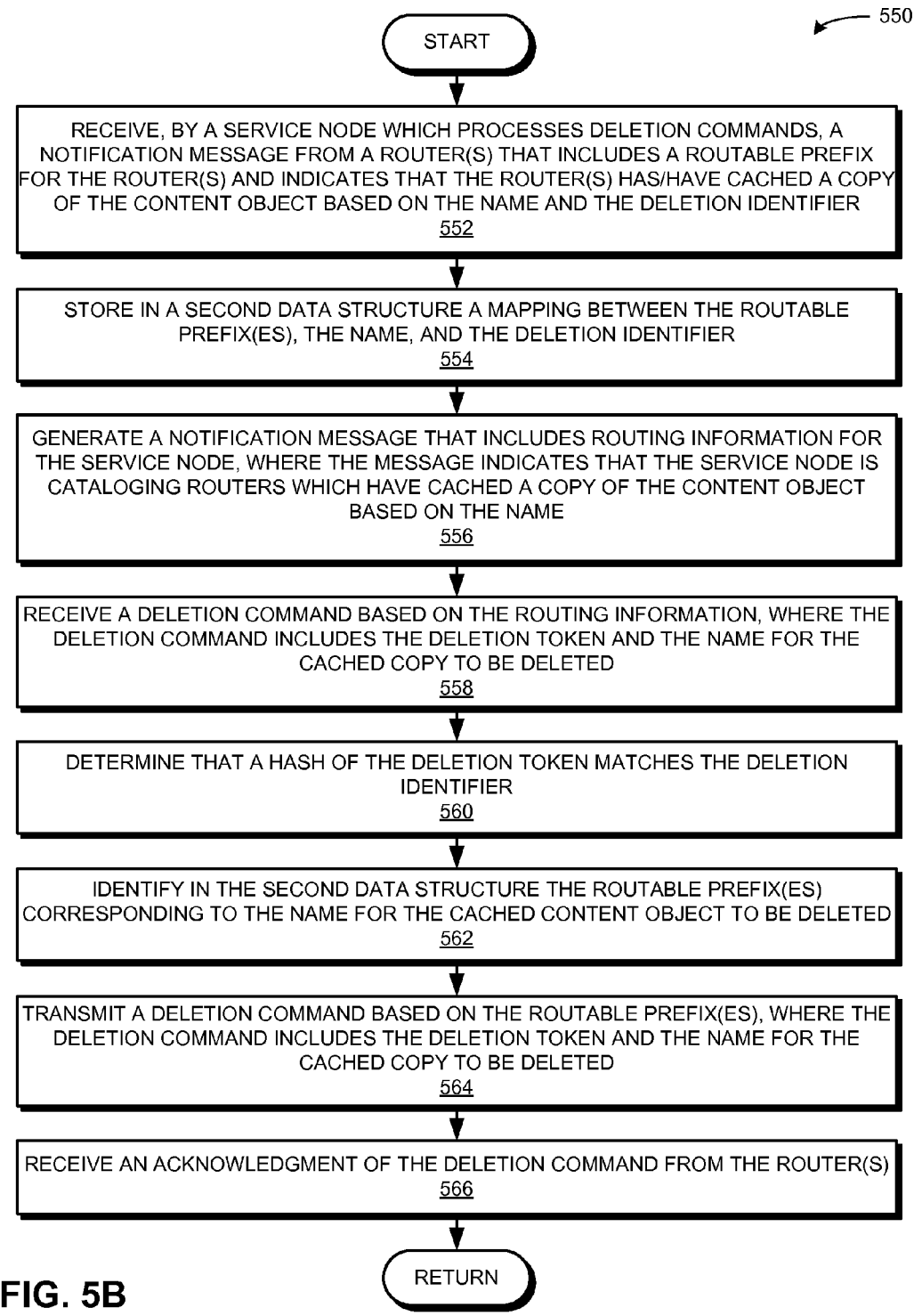
FIG. 5B presents a flow chart illustrating a method by a service node for facilitating explicit content deletion commands in a distributed manner, in accordance with an embodiment of the present invention.

FIG. 5B presents a flow chart 550 illustrating a method by a service node for facilitating explicit content deletion commands in a distributed manner, in accordance with an embodiment of the present invention. During operation, the system receives, by a service node which processes deletion commands, a notification message from a router(s) that includes a routable prefix for the router(s) and indicates that the router(s) has/have cached a copy of the content object based on the name for the content object and the deletion identifier (operation 552). The service node stores in a second data structure a mapping between the routable prefix(es), the name for the content object, and the deletion identifier (operation 554). The service node generates a notification message that includes routing information for the service node and indicates that the service node is cataloging routers which have cached a copy of the content object based on the name (operation 556). The service node can transmit the notification message to the producer of the content object.

Subsequently, the service node receives a deletion command based on the routing information, where the deletion command includes the deletion token and the name for the cached copy to be deleted (operation 558). The deletion command can be received from the producer. The service node determines that a hash of the deletion token matches the deletion identifier (operation 560). The service node identifies in the second data structure the routable prefix(es) corresponding to the name for the cached content object to be deleted (operation 562). The service node transmits a deletion command based on the routable prefix(es), where the deletion command includes the deletion token and the name for the cached copy to be deleted (operation 564). The service node receives an acknowledgment of the deletion command from the router(s) (operation 566). Upon receiving the acknowledgment from the router(s) listed in the second data structure, the service node generates an acknowledgment which is destined for the producer. The acknowledgment indicates that the router(s) has/have deleted the copy of the content object from the respective cache.

Role of Router or Intermediate Node

Figure 6:
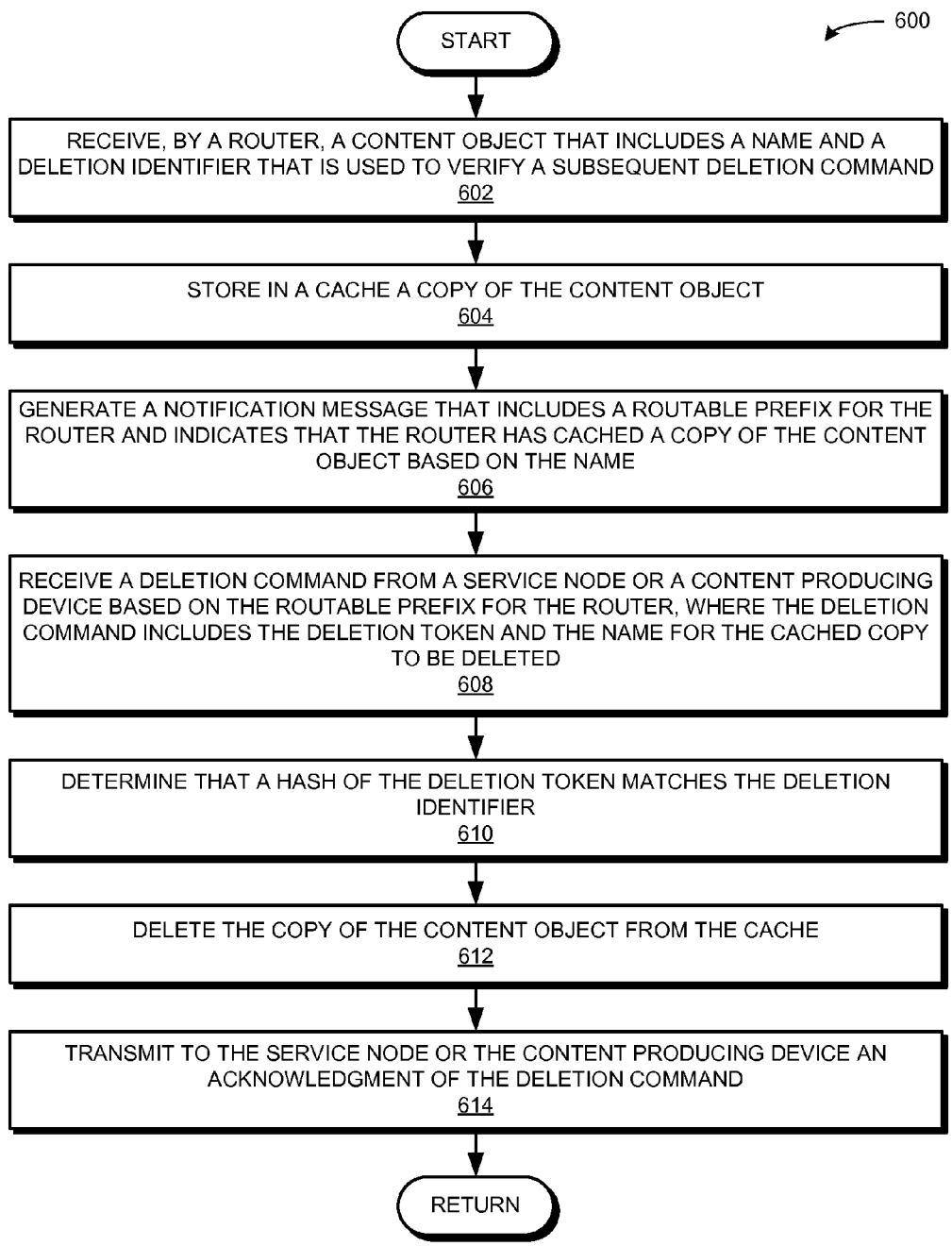
FIG. 6 presents a flow chart illustrating a method by a router or intermediate node for facilitating explicit content deletion commands, in accordance with an embodiment of the present invention.

FIG. 6 presents a flow chart 600 illustrating a method by a router or intermediate node for facilitating explicit content deletion commands, in accordance with an embodiment of the present invention. During operation, the system receives, by a router or an intermediate node, a content object that includes a name for the content object and a deletion identifier that is used to verify a subsequent deletion command (operation 602). The router stores in a cache a copy of the content object (operation 604). The router generates a notification message that includes a routable prefix for the router and indicates that the router has cached a copy of the content object based on the name (operation 606). The router receives a deletion command from a service node or a content producing device based on the routable prefix for the router, where the deletion command includes the deletion token and the name for the cached copy to be deleted (operation 608). The router determines that a hash of the deletion token matches the deletion identifier (operation 610). The router deletes the copy of the content object from the cache (operation 612). The router transmits to the service node or the content producing device an acknowledgment of the deletion command (operation 614). The acknowledgment indicates that the router has deleted the copy of the content object from its cache.

Exemplary Apparatus and Computer System

Figure 7:
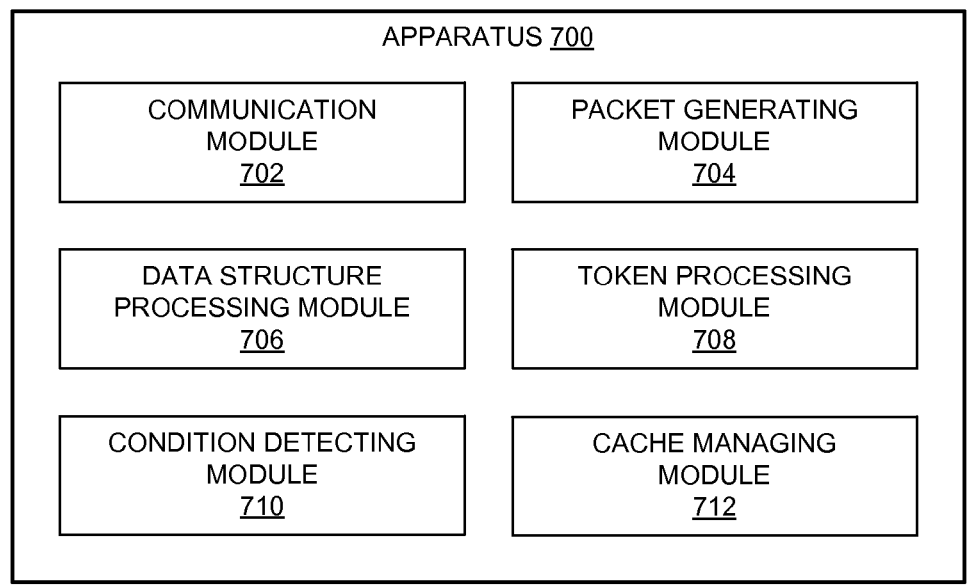
FIG. 7 illustrates an exemplary apparatus that facilitates explicit content deletion commands, in accordance with an embodiment of the present invention.

FIG. 7 illustrates an exemplary apparatus 700 that facilitates explicit content deletion commands, in accordance with an embodiment of the present invention. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, a packet generating module 704, a data structure processing module 706, a token processing module 708, a condition detecting module 710, and a cache managing module 712.

In some embodiments, communication module 702 can send and/or receive data packets to/from other network nodes across a computer network, such as a content centric network. A data packet can include an interest packet with a name. A data packet can also include a content object packet with a name for the content object and a deletion identifier that is used to verify a subsequent deletion command. A data packet can also include a notification message that includes a routable prefix for a router or routing information for a service node, where the message indicates that the router has cached a copy of the content object packet or that the service node is cataloging routers which have cached a copy of the content object packet. Packet generating module 704 can generate a content object packet that includes a name and a deletion identifier that is used to verify a subsequent deletion command. Data structure processing module 706 can store in a first data structure a mapping between the routable prefix, the name, and a previously generated deletion token which is used as a pre-image of the deletion identifier. In response to condition detecting module 710 determining a condition to delete the cached copy of the content object packet at the router, communication module 702 can transmit a deletion command based on the routable prefix or routing information. Token processing module 708 can generate the deletion token such that the deletion identifier is the result of a hash function performed on the deletion token.

Token processing module 708 can, when the deletion command is transmitted to the router, cause the router to determine that a hash of the deletion token matches the deletion identifier. Cache managing module 712 can delete the cached copy. Communication module 702 can transmit an acknowledgment of the deletion command to a content producing device or a service node, and can further receive an acknowledgement of the deletion command from a router or a service node.

Data structure processing module 706 can store (e.g., by a service node) in a second data structure a mapping between the routable prefix, the name, and the deletion identifier. Token processing module 708 can, when the deletion command is transmitted to the service node, cause the service node to determine that a hash of the deletion token matches the deletion identifier, and communication module 702 can transmit the deletion command to the router. Cache managing module 712 can store in a cache a copy of the content object packet (cache managing module 712) and packet generating module 704 can generate a notification message that includes a routable prefix for the router and indicates that the router has cached the copy of the content object packet.

Figure 8:
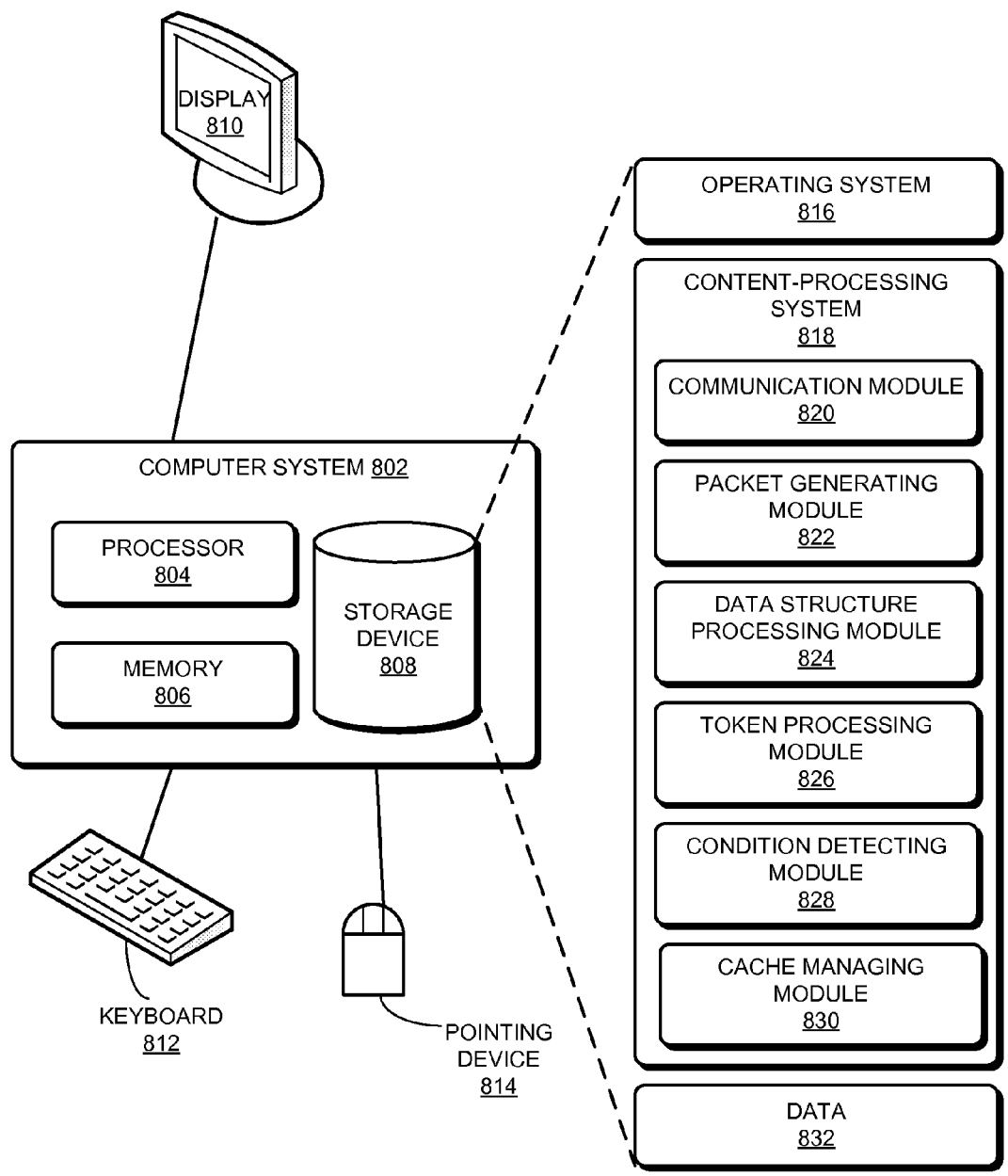
FIG. 8 illustrates an exemplary computer and communication system that facilitates explicit content deletion commands, in accordance with an embodiment of the present invention.

FIG. 8 illustrates an exemplary computer and communication system that facilitates explicit content deletion commands, in accordance with an embodiment of the present invention. Computer and communication system 802 includes a processor 804, a memory 806, and a storage device 808. Memory 806 can include a volatile memory (e.g., RAM) that serves as a managed memory, and can be used to store one or more memory pools. Furthermore, computer and communication system 802 can be coupled to a display device 810, a keyboard 812, and a pointing device 814. Storage device 808 can store an operating system 816, a content-processing system 818, and data 832.

Content-processing system 818 can include instructions, which when executed by computer and communication system 802, can cause computer and communication system 802 to perform methods and/or processes described in this disclosure. Specifically, content-processing system 818 may include instructions for generating a content object packet that includes a name for the content object and a deletion identifier that is used to verify a subsequent deletion command (packet generating module 822). Content-processing system 818 can include instructions for receiving a notification message that includes a routable prefix for a router and indicates that the router has cached a copy of the content object packet (communication module 820) and for storing in a first data structure a mapping between the routable prefix, the name, and a previously generated deletion token which is used as a pre-image of the deletion identifier (data structure processing module 824). Content-processing system 818 can include instructions for, in response to determining a condition to delete the cached copy of the content object packet at the router (condition detecting module 828), transmitting a deletion command based on the routable prefix (communication module 820). Content-processing system 818 can include instructions for generating the deletion token such that the deletion identifier is the result of a hash function performed on the deletion token (token processing module 826).

Content-processing system 818 can further include instructions for, when the deletion command is transmitted to the router, causing the router to determine that a hash of the deletion token matches the deletion identifier (token processing module 826), delete the cached copy (cache managing module 830), and transmit an acknowledgment of the deletion command (communication module 820). Content-processing system 818 can include instructions for receiving an acknowledgment of the deletion command from the router (communication module 820).

Content-processing system 818 can also include instructions for receiving a notification message that includes routing information for a service node which processes deletion commands (communication module 820). Content-processing system 818 can include instructions for, in response to determining a condition to delete the cached copy of the content object packet at the router (condition detecting module 828), transmitting a deletion command based on the routing information (communication module 820), and receiving an acknowledgment of the deletion command from a service node (communication module 820). Content-processing system 818 can include instructions for receiving, by the service node, a notification message that includes a routable prefix for the router and indicates that the router has cached a copy of the content object packet (communication module 820), and for storing, by the service node, in a second data structure a mapping between the routable prefix, the name, and the deletion identifier (data structure processing module 824). Content-processing system 818 can include instructions for, when the deletion command is transmitted to the service node, causing the service node to determine that a hash of the deletion token matches the deletion identifier (token processing module 826) and transmit the deletion command to the router (communication module 820).

Content-processing system 818 can further include instructions for receiving a content object packet that includes a name for the content object and a deletion identifier that is used to verify a subsequent deletion command (communication module 820). Content-processing system 818 can include instructions for storing in a cache a copy of the content object packet (cache managing module 830) and for generating a notification message that includes a routable prefix for the router and indicates that the router has cached the copy of the content object packet (packet generating module 822). Content-processing system 818 can include instructions for determining, by the router, that a hash of the deletion token matches the deletion identifier (token processing module 826), deleting the cached copy (cache managing module 830), and transmitting an acknowledgment of the deletion command to the content producing device or the service node (communication module 820).

Data 832 can include any data that is required as input or that is generated as output by the methods and/or processes described in this disclosure. Specifically, data 832 can store at least: a packet that corresponds to an interest, a content object, a notification message, a deletion command, or an acknowledgement; a name; a hierarchically structured variable length identifier; a deletion identifier; a deletion token that is used as a pre-image of the deletion identifier; a data structure; a routable prefix for a router; routing information for a service node; a hash of a deletion token; a name for an interest or content object; and a cache.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating explicit content deletion, the system comprising:
   a processor; and
   a storage device storing instructions that when executed by the processor cause the processor to perform a method, the method comprising:
   generating, by a content producing device, a content object packet that includes a name for the content object and a deletion identifier that is used to verify a subsequent deletion command from the content producing device, wherein the name is hierarchically structured variable length identifier that includes contiguous name components ordered from a most general level to a most specific level;
   receiving a notification message that includes a routable prefix for a router and indicates that the router has cached a copy of the content object packet;
   storing in a data structure a mapping between the routable prefix, the name, and a previously generated deletion token, wherein the deletion token is generated such that the deletion identifier is the result of a hash function performed on the deletion token;
   in response to determining a condition to delete the cached copy of the content object packet at the router, transmitting a deletion command based on the routable prefix to the router, wherein the deletion command includes the deletion token and the name for the cached copy of the content object packet to be deleted and causes the router, in response to determining that a hash of the deletion token matches the deletion identifier, to delete the cached copy, and to transmit an acknowledgement of the deletion command to the content producing device.

2. The computer system of claim 1, wherein the deletion identifier is used by the router to verify the deletion command.

3. The computer system of claim 1, wherein the method further comprises:
   receiving the acknowledgement of the deletion command from the router.

4. The computer system of claim 1, wherein transmitting the deletion command further comprises:
   identifying in the data structure a plurality of routable prefixes which correspond to a plurality of routers, wherein the routable prefixes are associated with the name and the deletion token; and
   transmitting the deletion command to the plurality of routers based on the respective routable prefixes, which causes each of the plurality of routers, in response to determining that a hash of the deletion token matches the deletion identifier, to:
delete the cached copy; and
transmit an acknowledgment of the deletion command to the content producing device.

5. The computer system of claim 1, wherein the method further comprises:
receiving the acknowledgement of the deletion command from each of the plurality of routers.

6. The computer system of claim 1, wherein the notification message is a first interest packet that does not leave a state in a pending interest table of a receiving entity, and wherein the deletion command is a second interest packet that is a request for a responsive content object packet corresponding to the acknowledgement.

7. A computer system for facilitating explicit content deletion, the system comprising:
a processor; and
a storage device storing instructions that when executed by the processor cause the processor to perform a method, the method comprising:
generating, by a content producing device, a content object packet that includes a name for the content object and a deletion identifier that is used to verify a subsequent deletion command from the content producing device, wherein the name is a hierarchically structured variable length identifier that includes contiguous name components ordered from a most general level to a most specific level;
receiving, by the content producing device, a notification message that includes routing information for a service node which processes deletion commands, wherein the message indicates that the service node is cataloging routers which have cached a copy of the content object packet;
storing in a first data structure a mapping between the routing information for the service node, the name, and a previously generated deletion token, wherein the deletion token is generated such that the deletion identifier is the result of a hash function performed on the deletion token;
in response to determining a condition to delete the cached copy of the content object packet at a router, transmitting a deletion command based on the routing information to the service node, wherein the deletion command includes the deletion token and the name for the cached copy of the content object packet to be deleted, and causes the service node, in response to determining that a hash of the deletion token matches the deletion identifier, to transmit the deletion command to the router and the deletion command causes the router, in response to determining that a hash of the deletion token matches the deletion identifier, to delete the cached copy, and to transmit an acknowledgement of the deletion command to the service node.

8. The computer system of claim 7, wherein the method further comprises:
receiving, by the service node, a notification message that includes a routable prefix for the router and indicates that the router has cached a copy of the content object packet; and
storing, by the service node, in a second data structure a mapping between the routable prefix, the name, and the deletion identifier.

9. The computer system of claim 7, wherein the method further comprises:
receiving, by the service node, the acknowledgement of the deletion command from the router.

10. The computer system of claim 8, wherein the deletion command transmitted to the service node causes the service node, in response to determining that a hash of the deletion token matches the deletion identifier, to:
identify in the second local data structure a plurality of routable prefixes which correspond to a plurality of routers, wherein the routable prefixes are associated with the name and the deletion token; and
transmit the deletion command to the plurality of routers based on the respective routable prefixes, which causes each of the plurality of routers, in response to determining that a hash of the deletion token matches the deletion identifier, to:
delete the cached copy; and
transmit an acknowledgement of the deletion command to the service node.

11. The computer system of claim 7, wherein the method further comprises:
receiving, by the content producing device, an acknowledgment of the deletion command from the service node.

12. The computer system of claim 8, wherein the notification message received by the service node is a first interest packet that does not leave a state in a pending interest table of a receiving entity, and wherein the deletion command is a second interest packet that is a request for a responsive content object packet corresponding to the acknowledgement.

13. A computer system for facilitating explicit content deletion, the system comprising:
a processor; and
a storage device storing instructions that when executed by the processor cause the processor to perform a method, the method comprising:
receiving, by a router, a content object packet that includes a name for the content object and a deletion identifier that is used to verify a subsequent deletion command, wherein the name is a hierarchically structured variable length identifier that includes contiguous name components ordered from a most general level to a most specific level;
storing in a cache a copy of the content object packet;
generating a notification message that includes a routable prefix for the router and indicates that the router has cached the copy of the content object packet;
transmitting the notification message to a content producing device or to a service node which processes deletion commands; and
in response to receiving a deletion command based on the routable prefix, wherein the deletion command includes the deletion token and the name for the cached copy of the content object packet to be deleted, and in response to determining that a hash of the deletion token matches the deletion identifier;
deleting the copy of the content object from the cache; and
transmitting an acknowledgement of the deletion command to the content producing device responsive to the deletion command being received from the content producing device and transmitting an acknowledgement of the deletion command to the service node responsive to the deletion command being received from the service node.

14. The computer system of claim 13, wherein the routable prefix is included in the notification message by appending the routable prefix to the name for the notification message, wherein the notification message is an interest packet.

* * * * *